United States Patent [19]

Smith et al.

[11] Patent Number: 4,751,115

[45] Date of Patent: Jun. 14, 1988

[54] REFLECTIVE SUN SCREEN

[76] Inventors: James P. Smith, 25126 Ave. 21, Madera, Calif. 93638; Virginia R. Lloyd, 263 Bell Canyon Rd., Bell Canyon, both of Calif. 91307

[21] Appl. No.: 927,398

[22] Filed: Nov. 6, 1986

[51] Int. Cl.⁴ ............................................... E06B 9/24
[52] U.S. Cl. .................................... 428/12; D12/191; 296/95 C; 296/97 E
[58] Field of Search .................... 160/84 R; D12/191; 296/97 E, 97 G, 97 A, 97 R, 95 C; 428/12, 121

[56] References Cited

U.S. PATENT DOCUMENTS

| | | | |
|---|---|---|---|
| 2,239,240 | 4/1941 | Magness | D12/191 X |
| 2,528,038 | 10/1950 | Crise | D12/191 X |
| 2,806,809 | 9/1957 | Schuh | 160/84 R X |
| 2,874,611 | 2/1959 | Luboshez | 160/84 R X |
| 3,003,812 | 10/1961 | Haugland | 296/97 E |
| 3,817,309 | 6/1974 | Takazawa | 160/84 R |
| 3,880,461 | 4/1975 | Flanagan | 296/97 G X |
| 3,957,301 | 5/1976 | Huber | 296/95 R |
| 4,006,933 | 2/1977 | Simpson | D12/191 X |
| 4,202,396 | 5/1980 | Levy | 160/84 R X |
| 4,671,558 | 6/1987 | Cline | 296/97 E X |

*Primary Examiner*—Henry F. Epstein

[57] ABSTRACT

A reflective sun screen for use in an automobile is disclosed herein having a rectangular heat absorbing board scored at selected spaced apart locations across its length so as to be folded over upon itself in accordion-style fold for storage purposes. A reflective film having graphic renderings is laminated to a surface of the board and provides irregular surface areas of translucent sections so that varying reflective surface portions appear on the surface. The screen constitutes a graphic poster having solar heat absorption characteristics.

1 Claim, 1 Drawing Sheet

REFLECTIVE SUN SCREEN

BACKGROUND OF THE INVENTION

1. Field of the Invention

The present invention relates to sun screens and more particularly to a novel poster-type sunscreen having a reflective surface and heat absorption characteristics for use in protecting the interior of an automobile.

2. Brief Description of the Prior Art

In the past, it has been the conventional practice to employ a variety of folding window shields that are detachably carried against the inside windows of an automobile. In this connection, the shields interfere with sunrays so that the rays do not enter the interior of the vehicle which would normally cause damage and which would heat the interior thereof. However, difficulties and problems have existed with conventional auto sun shields which stem largely from the fact that their sole purpose in function is to interfere with the sunrays and the conventional shields do not absorb heat nor do they lessen the effect of interior heating by reflecting sunrays away from the shield. Also, the exterior surface of conventional shields does not include graphic subject matter that controls or determines the degree of reflectivity on the external surface. Such graphic subject matter used in conventional shields is very primitive and in no way affects the sunray penetration of the shield.

Therefore, a long standing need has existed to provide a novel sun screen having a surface which reduces the passage of sunrays therethrough by reflective means and which incorporates heat absorption characteristics. Graphic subject matter carried on a reflective surface would provide areas of selective translucency as well as areas of relative opaqueness so that a tolerable reflective surface to oncoming personnel can be provided.

SUMMARY OF THE INVENTION

Accordingly, the above problems and difficulties are obviated by the present invention which provides a novel sun screen having a foldable board carrying a reflective surface which is composed of a plurality of translucent and opaque portions. The graphic subject matter is of a refined portrayal of pictorial indicia which subject matter determines the areas of density for determining translucent and opaque portions. The board carrying the pictorial subject matter is of heat absorption material so that temperature reduction within the interior of an automobile is lessened through the reflective and heat absorption characteristics of the inventive sun screen. Therefore, the inventive sun screen is not to be confused with conventional sun shades or sunray blocking mediums.

Therefore, it is among the primary objects of the present invention to provide a novel sun screen or poster screen which incorporates both sunray reflection and solar heat absorption characteristics to reduce the interior auto temperature when the screen is installed against windows of the automobile.

Another object of the present invention is to provide an inexpensive means for reducing the interior temperature of an automobile by employing combined solar reflective and heat absorption characteristics in the form of a screen that may be readily installed or disassembled from the interior windows of the automobile.

Another object of the present invention is to provide a novel combined poster and sun screen incorporating graphic subject matter over a reflective surface so as to provide irregular areas of translucency and opaqueness whereby both aspects of solar reflection and heat absorption characteristics are employed to reduce auto interior temperature.

Yet another object of the present invention is to provide a relatively inexpensive combined poster and solar screen having an operative position outwardly unfolded to be detachably carried against the interior surface windows of an automobile and having a folded position suitable for insertion into a sleeve-like container when not in use.

Still a further object of the present invention is to provide a novel poster and solar screen mountable against the interior windows of a vehicle so as to reflect sunrays exteriorly of the automobile and for absorbing heat so as to greatly reduce the temperature of the auto interior.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
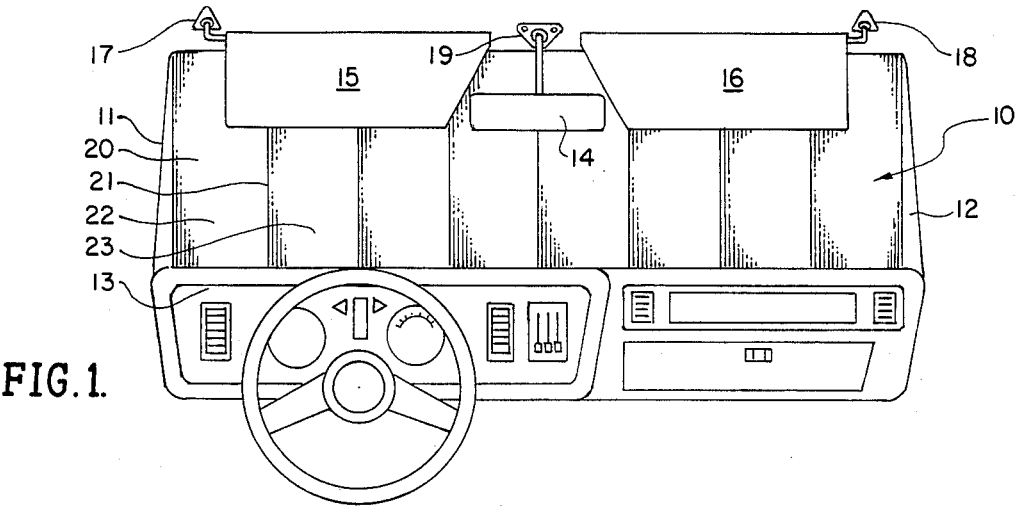
FIG. 1 is a rear view of the inventive poster and sun screen device illustrated as being installed across the interior front windshield of a vehicle.

Referring to FIG. 1, the novel solar and poster screen of the present invention is shown in the general direction of arrow 10 and is illustrated in a typical installation extending across the interior of the front windshield of a vehicle. The opposite ends of the screen extend between the opposite window jambs identified by numerals 11 and 12 and across the top of the dashboard indicated by numeral 13. In one form, the solar screen is maintained in position by means of the midportion of the screen resting against the back side of a vehicle mirror 14 while the flaps or visors 15 and 16 are rotated to a position against the back side of the screen adjacent to the upper edge marginal regions at the ends of the screen. It is to be particularly noted that the visors 15 and 16 are carried on a universal mount such as mounts 17 and 18 respectively. The mounting for mirror 14 is fixed to a fixture 19.

It is noted that the shield 10 comprises an elongated board identified by numeral 20 which is substantially rectangular in configuration. The length of the board 20 is divided into a plurality of sections separated by a score line such as score line 21 separating sections 22 and 23, whereby the length of the board may be folded accordion-style into a storage configuration wherein the sections are laid upon one another in a stack. When unfolded, these sections are integral with one another. In order to further retain the length of board in position against the back side of the windshield, the opposite ends of the unfolded board may be jammed or forcibly urged into a binding relationship with the respective window frame or jambs 11 and 12 respectively; in such a situation, the visors 15 and 16 as well as the mirror 14 need not be employed for holding the shield in position.

Figure 2:
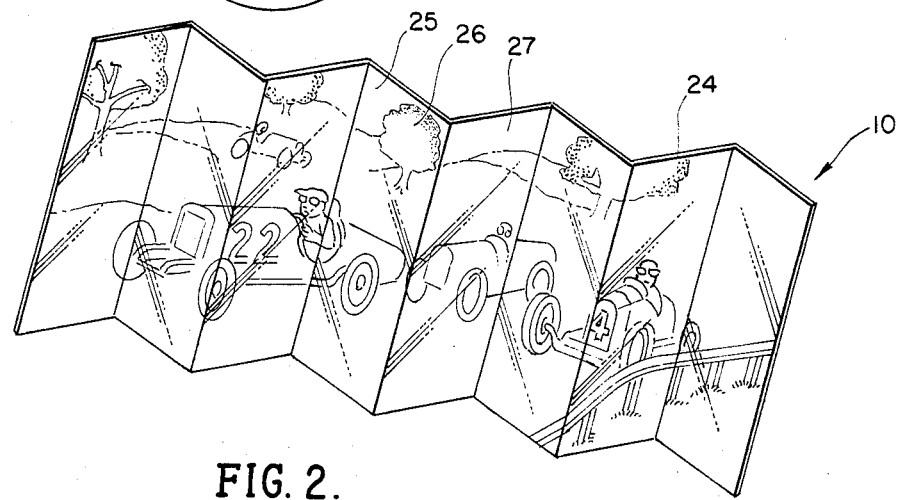
FIG. 2 is a perspective view showing the front side of the poster and sun screen of the present invention showing the reflective surface and the graphic subject matter carried thereon.
Figure 3:
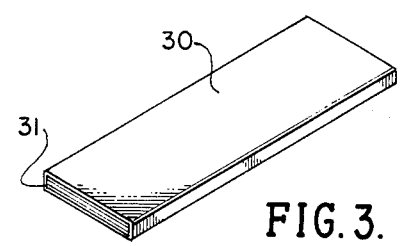
FIG. 3 is a perspective view of a sleeve-like container for storing the sun screen shown in FIG. 2 in a folded position.
Figure 5:
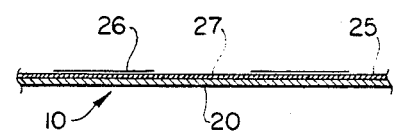
FIG. 5 is a fragmentary cross sectional view of the reflective sun screen.

Referring now in detail to FIG. 2, the front side of the screen 10 is illustrated in an unfolded condition. In this condition, it can be seen that the front side of the shield 10 includes a backboard 24 on which a thin film of reflective material 25 is laminated therewith. The reflective coating or film 25 includes pictorial subject matter which ranges in density from a relatively opaque section represented in general by numeral 26 to a relatively translucent section indicated by numeral 27. These latter sections or portions provide a differential in sunlight reflection that provides an overall muted effect so as not to be bothersome to oncoming traffic or oncoming observers. The overall configuration of the board is rectangular, having straight edges on its side as well as its end. The respective scored fold lines are arranged in fixed parallel spaced apart relationship and divide the length of the board into equal segments or sections so that they may be folded over upon themselves in a stacked manner for storage purposes. When so stacked, the board may easily be slipped through the open end of a sleeve-like container 30 as shown in FIG. 3. The open end is indicated by numeral 31 and the width of the container 30 is substantially equal to the width of a single section while the length of the container is substantially equal to the width of the entire board 10.

In constructing the solar screen or poster screen 10, it is noted that the board may be a length of craft paper on which the "solar film" is laminated. The film or coating is a reflective foil or acetate and the reflective film is laminated to one surface of the bleached craft paper backing that is carried on an E flute corrugated board. Prior to lamination of the film to the craft paper board, graphic representations or indicia are applied to the film surface. First, the surface is treated for printing followed by laminating the film to the craft paper of the board. Next, the graphic subject matter or indicia is printed so that the overall characteristics of the graphics are muted between sections of translucent areas and other portions or sections which are opaque. If desired, a protective varnish or coating may be placed over the printed graphics on the film. At this time, the board carrying the graphic film is scored every 6½ inches on the back side followed by folding with every other fold reversed. The folds take on a "set" to provide an accordion folding effect permitting expansion for operative use or folding over upon itself for storage purposes. The storage box 30 may be employed for holding the folded screen for storage purposes and end flaps may be employed for closing the open ends of the sleeve-like container after the folded screen has been placed therein.

Figure 4:
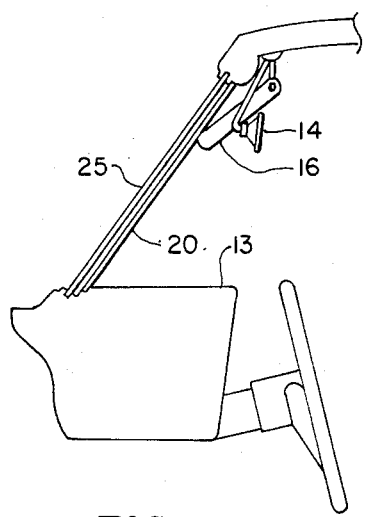
FIG. 4 illustrates the inventive sun screen removably installed against the interior surface of a windshield.

In actual use, the board is deployed or unfolded to the position shown in FIG. 2 and the board is placed against the back side of the windshield so that the graphic or indicia carried on the film on the front of the board is against the windshield. The top marginal region of the back side of the board can rest against the back side of the mirror and the visors 15 and 16 can be employed to further retain the reflective board in position. The opposite ends may be tucked into the sides of the front windshield frame and the lower edge of the board can be carried in a slot provided in the dashboard adjacent to the lower portion of the windshield. Such an arrangement is shown in FIG. 4.

Once installed, the reflective surface of the graphic film will reflect oncoming sunrays through the windshield so that these rays are not only blocked from entering the interior of the vehicle but the rays are deflected exteriorly from the vehicle. Also, if desired, an alternate version may include placing the reflective film on the back side of the board 20 as well. In either version, it is to be understood that applicants' corrugated board absorbs heat whereas prior art's devices merely block sunrays. This is why conventional devices are referred to simply as shades or shields. Also, it is noted that the inventive screen is of a poster type with respect to the graphics carried on the film and that the position and nature of the graphics is important to the reflectivity of the sunrays. Therefore, it is not merely for ornamental purposes that the graphics are employed since the graphics in their relative portions of translucency and opaqueness have a direct bearing on reflectivity of the surface. Graphics on conventional shades or shields are for decorative purposes only and do not provide a differential in reflectivity of the surface. Also, reflective ink may be used for applying indicia or graphics to the screen surface.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an automotive vehicle provided with a window having an outside and an inside, an upper marginal edge and a lower marginal edge, the improvement which comprises:
   a foldable sunscreen having an elongated rigid backing board composed of heat absorbing material having a front planar surface for disposition adjacent to said window inside and a rear surface;
   a thin non-expandable film carried on said sunscreen board front planar surface in bonded relationship so as to be integral across the entire and total surface thereof;
   said film characterized as being reflective to sunlight;
   graphic renderings carried on specific portions of said film separating the entire reflective film surface into varying translucent and opaque areas;
   a plurality of parallel spaced apart score lines disposed through said film and backing board across the length of said board dividing said film and said board into a plurality of elongated parallel panels extending across the length of said film and backing board whereby said panels are folded over upon themselves about said score lines to provide a stacked storage condition and extending said panels to an unfolding postition provides an operative condition;
   said backing board is composed or corrugated cardboard and said laminated film is composed of acetate;
   said graphic rendering on said reflective film provides an overall muted or dulled surface defined by said translucent and said opaque areas; and
   said visors, said mirror and said window edges constitute a retention means to removably support said backing board in its operative condition.

* * * * *